United States Patent Office 3,031,984
Patented May 1, 1962

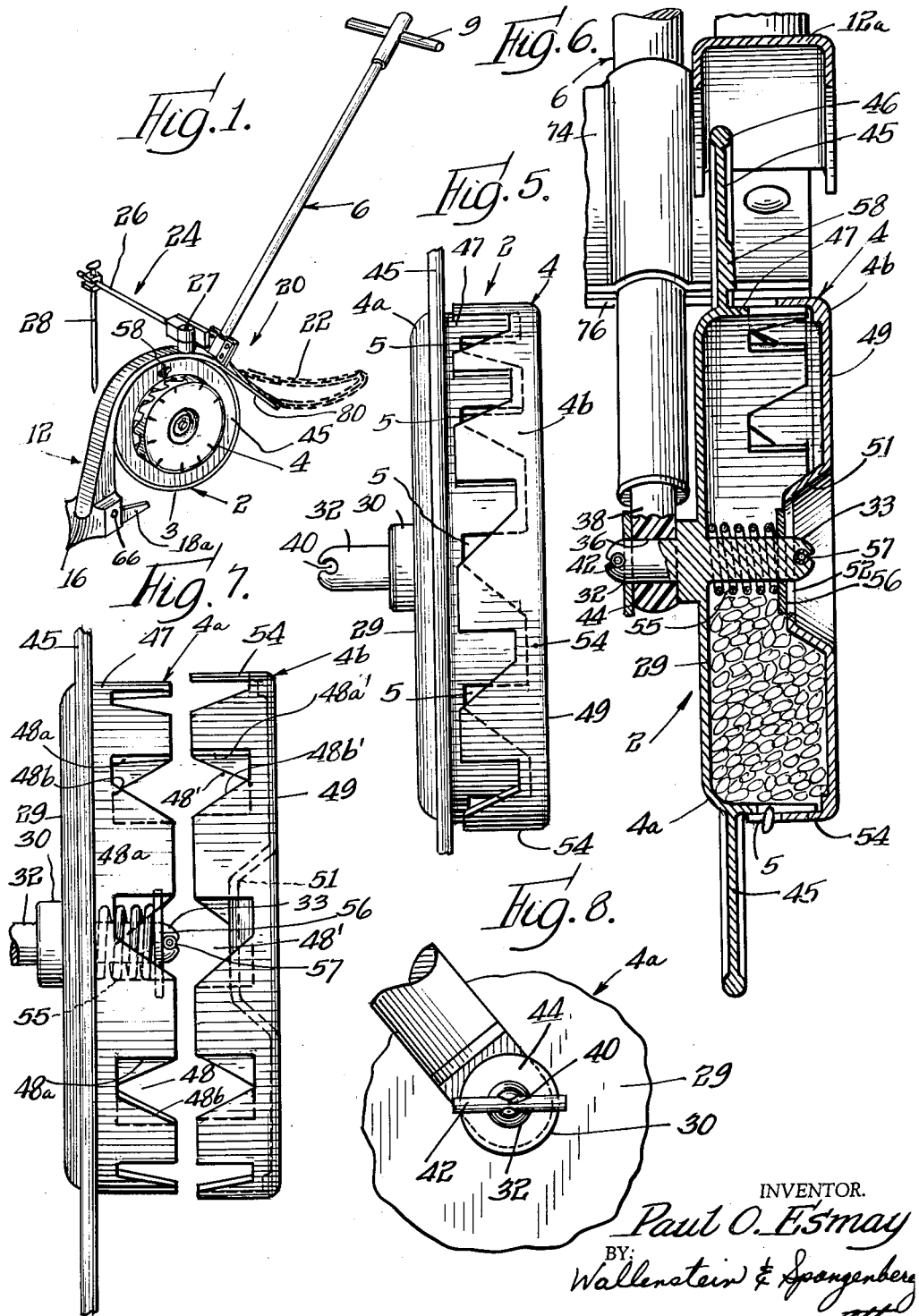

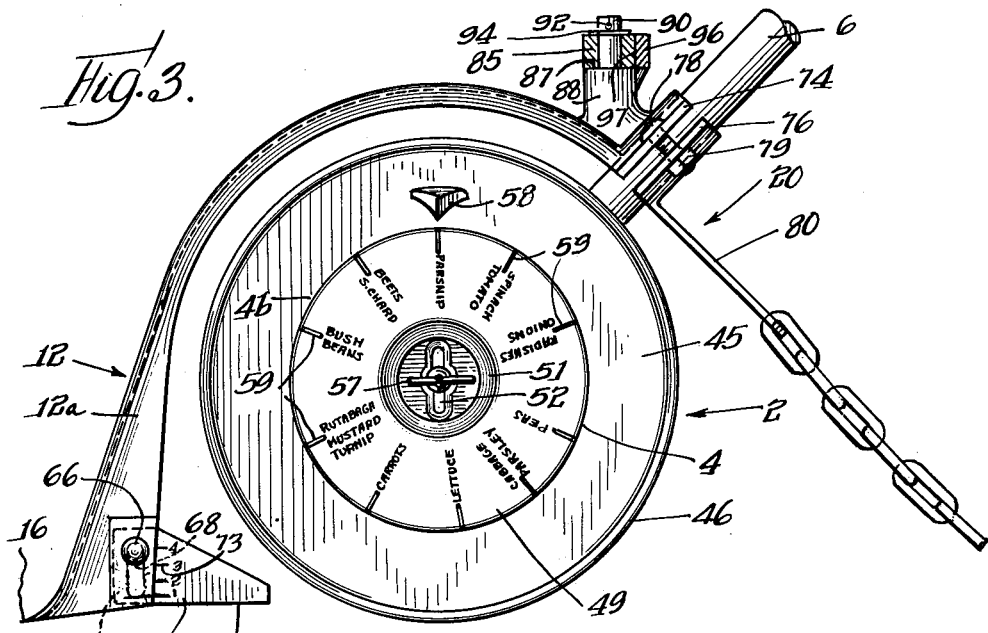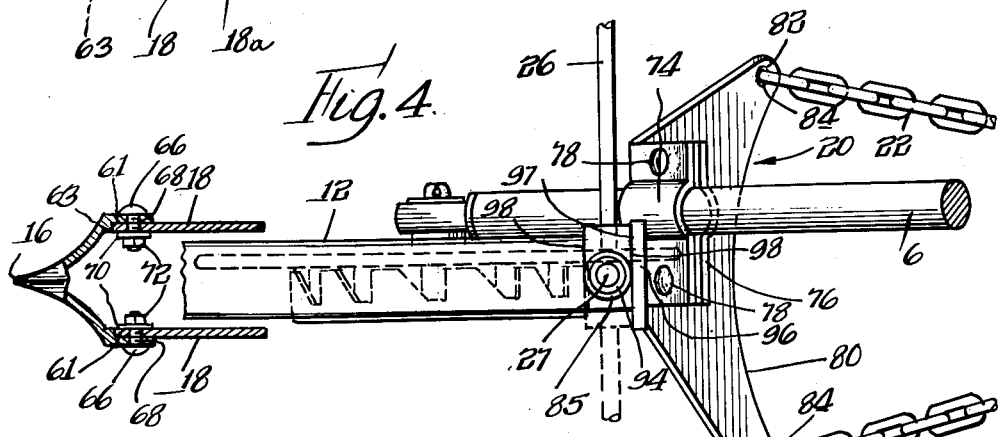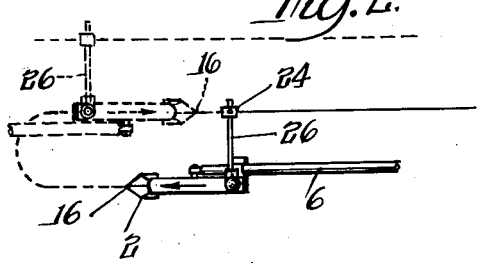

3,031,984
ROW SEEDER
Paul O. Esmay, 1600 Main St., Three Rivers, Mich.
Filed June 16, 1958, Ser. No. 742,270
2 Claims. (Cl. 111—82)

The present invention relates to a home garden row seeder for spreading vegetable seeds, or flower seeds corresponding in size to vegetable seeds, at fixed intervals in a row.

The preparation of a home garden can be a slow, tedious process involving the laying out and formation of shallow, equally-spaced furrows for receiving the seeds, the manually depositing of the seeds one at a time at spaced points in the various furrows, and the filling-in of the furrows with a shovel or by kicking or otherwise pushing the removed dirt back into the shallow furrows. Although complicated and expensive machinery has been developed for commercial farming which automatically plows the furrows, plants the seeds and fills-in the furrows, little has been done to develop relatively simple, sturdy and economical implements for carrying out most or all of these functions in a home vegetable garden or the like. One home garden seeding implement which has been developed for planting seeds in a row comprises a seed container mounted for rotation upon a wheel attached to the bottom end of a long handle having a hand grip at the upper end thereof. This seed container is provided with one or more openings which deposit a seed each time an opening is brought to the bottom of the container as the wheel is rolled along the ground. This implement, however, left much to be desired particularly from the standpoint of the limited functions which it performed, namely, merely depositing seeds at fixed intervals in a row.

It is, accordingly, an object of the present invention to provide a home garden row seeder of the general type just described which, in addition to the function of planting seeds in a row, also performs one or more other functions, such as cutting a furrow to proper depth, filling-in the furrow after the seeds have been planted, and marking a line spaced a given lateral distance from the furrow being dug, so that the next row to be plowed or dug is automatically laid out with each pass of the seeder. An ancillary object of the present invention is to provide a relatively inexpensive, simple, yet rugged, implement which in a single pass over a given row digs a furrow, plants the seeds in the furrow at definite intervals, fills in the furrow, and also preferably marks the next row to be covered by the implement.

Still another object of the invention is to provide a seeder including furrow-forming means and/or row-marking means wherein the depth of the furrow and/or the spacing of the rows may be readily varied.

A more specific object of the invention is to provide a home garden row seeder preferably including a wheel assembly rotatably mounted upon the bottom of a relatively long and upwardly and rearwardly extending handle or frame piece, wherein the frame piece supports a furrow-forming means with a pointed end located in front of the wheel assembly and wherein, further, means are provided for enabling the user to maintain a constant and predetermined depth of the pointed end of the furrow-forming means without difficulty.

Still another aspect of the invention is to provide a seeder as just described which additionally includes an easy to operate, row-marking means which can mark off the next row to be covered by the implement as the seeder performs its operation on a given row, in either direction of movement down a given row.

Another object of the invention is to provide a home garden row seeder having a rugged seed container whereby the size of the seed-dispensing openings can be precisely and easily varied.

Other objects and advantages of the invention will become apparent when making reference to the specification to follow which describes the various aspects of the present invention in detail.

In the drawings:

FIG. 1 is a perspective view of a home garden row seeder constructed in accordance with the present invention;

FIG. 2 is a plan view of the implement in FIG. 1, drawn to reduced scale, showing the manner in which the seeder automatically marks a line extending along the next row to be covered by the implement;

FIG. 3 is an enlarged, fragmentary, side elevational view, partly broken away, of the seeder in FIG. 1, showing the construction of the furrow-forming, seeding, furrow-covering and row-marking portions of the seeder;

FIG. 4 is a plan view, partly broken away, of a portion of the seeder shown in FIG. 3;

FIG. 5 is a fragmentary end elevational view of the wheel assembly portion of the seeder and the seed container formed thereby;

FIG. 6 is a sectional view of the wheel assembly and the handle-forming rod to which it is mounted;

FIG. 7 is an exploded view of the two main parts making up the wheel assembly;

FIG. 8 is a fragmentary side elevational view of the other side of the wheel assembly from that shown in FIG. 3; and FIG. 9 is an end view of the row-marking portion of the seeder.

Referring now more particularly to FIG. 1, the home garden row seeder of the present invention includes a wheel assembly generally indicated by reference numeral 2 which includes a seed container 4 having seed-dispensing openings 5 in the perimeter thereof which deposit a seed at fixed intervals as the wheel assembly is rolled along the ground. The wheel assembly 2 is rotatively mounted upon the bottom of a frame piece or handle 6 which extends upwardly and rearwardly from the wheel assembly and terminates in a handle grip 9 at the top thereof. Furrow-forming means 12 is secured at the bottom of the handle 6 and includes a section extending down in front of the wheel assembly 2 and which terminates in a downwardly angling pointed end 16. The pointed end 16 is in a vertical longitudinal plane including the seed-dispensing openings 5 of the seed container 4. The depth of penetration of the pointed end 16 is determined by vertically adjustable ground-engaging foot means 18 which are located laterally outwardly and above the pointed end 16 and ride along the surface of the ground to limit the depth of penetration of the pointed end 16 of the furrow-forming means 12. The user merely pushes forward on the handle grip 9 until the pointed end 16 will not penetrate further without great difficulty. Then the user knows that the foot means 18 is riding on the surface of the ground. This greatly simplifies the use of the seeder since, without the ground-engaging foot means 18, he would have no accurate and definite way of knowing the depth of penetration of the pointed end 16 into the ground.

The seeder additionally includes a furrow-filling means 20 including a generally U-shaped chain 22, the ends of which are supported from respective points spaced laterally substantially the same distance on opposite sides of the vertical longitudinal plane passing through the pointed end 16 of the furrow-forming means 12 and the seed-dispensing openings 5. The U-shaped chain 22 drags along the ground behind the wheel assembly 2 and the end thereof guides and pushes the dug-up earth lining the furrow back into the furrow to fill the same. It can thus be seen that, in a single pass of the seeder, a furrow is dug to the proper depth, seeds are dispensed at fixed intervals in the furrow, and the seeded furrow is covered over.

The seeder of the present invention preferably further includes a row-marking means 24 which is pivotally supported above the wheel assembly 2 about a generally vertical axis located in said vertical longitudinal plane passing through the seed-dispensing openings 5 and the pointed end 16 of the furrow-forming means 12. The row-marking means includes a horizontally extending arm 26 and a horizontally adjustable line-scratching member 28 which scratches the ground to mark the next row to be covered by the seeder. The row-marking means 24 has a vertical pivot 27 which enables the arm 26 to be pivoted 180 degrees in front of the wheel assembly 2, along a horizontal arc terminating along a line extending at right angles to said vertical longitudinal plane. Limit means, to be described, are provided for engaging the rear of the horizontal arm 26 when positioned at the ends of said 180 degree arc of travel, the row-marking means being urged into one of these limiting positions by the frictional drag thereon as it is dragged along the ground.

Referring now to FIG. 2, when a row has been completed, the user pushes with his foot against the horizontal arm 26 to pivot it around into its opposite lateral position shown in dotted lines in FIG. 2, so that on the movement of the seeder in the opposite direction down the next row, the row-marking means will then automatically be in position to mark the next row to be covered by the seeder.

Now the various portions of the seeder have been briefly discussed, the constructional details of a preferred form of the invention will now be described.

The wheel assembly 2 of the seeder comprises a circular, wheel body 4a which may, although not necessarily, be an integral metal casting having a vertical central wall 29 from the inner side of which axially projects a central hub 30 and a central axle-forming extension 32. An outer axial central extension 33 projects from the other or outer side of the vertical wheel wall 29. The inner axle-forming extension 32 is journaled in an opening 36 formed in a bearing-forming extension 38 formed integrally or attached to the end of the handle 6, which may be made of a hollow metal tubular stock. The opposite sides of the bearing-forming extension 38 are flat and one side thereof engages a flat annular end face of the hub 30. The end of the axle-forming extension 32 is held on the bearing-forming extension 38 in any one of a number of ways including the one illustrated in the drawings. As there shown (referring more particularly to FIGS. 5 and 8), a slot 40 is formed in the end of the axle-forming extension 32 which extends beyond the bearing-forming extension 38. A pin 42 is held in the slot 40 by peening or otherwise deforming the walls of the slot 40 around the pin 42. A washer 44 is sandwiched between the pin 42 and the bearing-forming extension 38.

The wheel body 4a has an outwardly offset outer position 45 having a beaded rim 46 which is the ground-engaging portion of the wheel body.

The wheel body 4a has an axially outwardly-extending circular flange 47 concentric with the circular perimeter of the wheel body and located radially inwardly thereof. This flange has a series of identical, equally circumferentially spaced seed-forming slots 48 formed in the outer edges thereof. The slots have a straight, axially-extending end 48a and an opposite end 48b which inclines from its inner side away from the straight slot end 48a.

The slotted flange 47 in association with a cup-shaped member 4b forms the aforementioned seed container. The cup-shaped member 4b, which may be made of a molded plastic material, has a central vertical wall portion 49 having a depressed or recessed center portion 51 having a radial slot 52 which is enlarged in the center thereof. The cup-shaped member 4b has a circular peripheral wall 54 of only a slightly larger inside diameter than the outside diameter of flange 47 and has a series of identical, equally circumferentially spaced slots 48' which are of the same size, shape and placement as the slots 48 in the flange 47. Thus, the slots 48' have straight ends 48a' and inclined ends 48b'.

The cup-shaped member is securely adjustably supported in telescoped relation about the flange 47 by means including a compression spring 55 surrounding the outer axial extension 33 of the wheel body. The spring extends between the vertical wall 29 of the wheel body and a washer 56 which is urged by the spring toward a pin 57 secured in a slot formed in the end of the axial wheel body extension 33 by peening the walls of the slot over the pin.

The slot 52 formed in the recessed center wall portion 51 of the cup-shaped member 4b is of a size to pass over the end of the axial wheel body extension 33 and the pin 57 thereof. In so doing, the recessed wall portion 51 pushes the washer 56 inward against the restraining force of the spring, and by turning the member 4b so that the pin 57 is out of alignment with the slot 52, the member 4b is securely but adjustably held in position around the wheel body flange 47 by the frictional force between the washer 56 and the recessed wall portion 51. The slotted portions of the wheel body flange and cup-shaped member overlap and form the exposed aforementioned seed-dispensing openings 5, the size of which are a function of the relative angular positions of the overlapping slots. The smallest sized openings are provided by the intersection of the inclined slot ends 48b' of the cup-shaped member 4b with the innermost ends of the straight slot ends 48a of the wheel body or vice versa, as exemplified in FIG. 5.

The outer portion 45 of the wheel 4a surrounding the flange 47 is provided with an index marker 58 which may be a projecting portion molded integrally with the wheel body or otherwise placed thereon. The index marker 58 is alignable with any one of a number of radial index lines 59 formed on the central vertical wall 49 of the cup-shaped member. Preferably, there is placed opposite each index line information on the type of vegetable or flower seed which can be disbursed upon alignment of the marker 55 with such index line. The cup-shaped member 4b thus is an adjusting member which can readily be turned by pushing the adjusting member axially inwardly a small amount to separate the washer 56 from frictional locking engagement with the recessed central wall portion 51 thereof and then turning the same, while maintaining a small inward force, until the index marker 58 is aligned with the desired index line 57.

Referring now more particularly to FIGS. 3 and 4, the furrow-forming means 12 may include a molded plastic or metal body 12a which has a concave inner face which deepens and widens at the forward bottom end thereof. The bottom forward end of the body 12a narrows to a point to form the aforementioned downwardly extending pointed end 16. The inner side surfaces of the body 12a at the bottom forward end thereof are provided with a pair of flat vertical recesses 61—61 (FIG. 4) which terminate in transverse shoulders 63—63. The recesses 61—61 are spaced appreciably laterally on opposite sides of the vertical longitudinal plane of the seeder including the pointed end 16 and receive the front end portions of generally triangularly shaped plate members 18—18 forming the above-mentioned ground-engaging foot means. The plates have thicknesses approximately equal to the depths of the recesses 61—61, so that all surfaces are flush, to minimize the possibility of the caking-up of dirt within the body 12a. The forward ends of the plate member 18—18 abut the transverse shoulders 63—63. The recesses 61—61 extend vertically for a much greater extent than the width of the plate members so that appreciable vertical play is permitted between the plate members and the body 12a. The rear ends of the plate members 18—18 project rearwardly and longitudinally of the body 12a and have horizontal bottom edges 18a elevated above the pointed end 16 an amount equal to the desired depth of the furrow to be formed. The plate members 18—18 are vertically adjustably mounted upon the body 12a by bolts 66—66 passing through holes in the sides of the body 12a and respective vertical slots 68—68 formed in the forward ends of the plate members 18—18. Lock washers 70—70 and nuts 72—72 passing over the ends of the bolts lock the plate members in their adjusted vertical positions. The plate members 18—18 may contain index lines 73 thereon for identifying the various depths obtainable by aligning these lines with corresponding index markers on the associated sides of the body member 12a. The horizontal bottom edges of the plate members ride along the surface of the ground at points located laterally outwardly of the furrow dug by the pointed end and prevent further insertion of the pointed end 16 without application of appreciable force.

The body member 12a may be mounted on the bottom end of the frame piece or handle 6 in any one of a number of ways. The one illustrated includes a flanged collar 74 on the upper end of the body 12a which collar cooperates with a corresponding flanged collar 76. The flanged collars 74—76 are positioned in confronting relationship around the bottom of the handle or frame piece 6 and the two are secured together by means of bolts 78 passing through holes in the flanged portions of collars and nuts 79—79 threaded around the ends of the bolt 78—78.

The flanged collar 76 is preferably formed integrally with a winged plate 80 having downwardly extending ends 82—82 spaced laterally substantially the same distance on opposite sides of the vertical longitudinal plane passing through the pointed end 16 and the seed-dispensing openings 5. The winged plate 80 has respective holes 84—84 formed in the ends 82—82 thereof which holes are adopted to receive the end links of the chain 22. When the chain is suspended from the ends of the winged plate 80, the end of the chain lies along the ground, as shown most clearly in FIG. 1. When the chain is dragged along the ground, the chain assumes almost a sharp U or almost a V shape and the inner surfaces of the chain end thereby guide and push the dirt removed by the furrow-forming means 12 back into the furrow formed thereby.

Reference should now be made to FIGS. 3 and 4 illustrating the details of construction of the row-marking means 24. The horizontally extending member 26 of the row-marking means 24 comprises a rod having a circular hub 85 at its inner end. The hub 85 rests upon an upwardly facing annular shoulder 87 formed at the top of a boss 88 formed integrally with the body member 12a adjacent the flanged collar 74 thereof. Extending upwardly from the boss is a vertical pivot pin 90 around which is pivotally supported the hub 85 of the horizontal member 26 for rotation in a plane above the top of the body member 12a about a vertical axis located in said vertical longitudinal plane of the seeder. The hub 85 is held in place around the pin 90 by any suitable means, such as a cotter pin 92 passing through the pin 90 above the hub 50. A washer 94 is preferably interposed between the top of the hub 85 and the cotter pin 92. Movement of the rod 26 rearwardly of a horizontal line extending transversely of the seeder is prevented by means of a shoulder-forming extension 96 having a vertical forwardly facing shoulder 97. The hub 85 of the rod has opposite flat faces 98—98 which respectively engage the shoulder 97 when the horizontal rod 26 is in either of its extreme lateral positions.

The previously mentioned vertical ground-scratching member 28 has a collar 100 at the inner end thereof slidably disposed around the horizontal rod 26. A locking screw 102 is threaded through the top of the collar 100 to make locking engagement with the top of the rod 26 to hold the member 28 in any one of a number of horizontal positions depending upon the desired spacing between the successive rows desired. Index marks 104 may be placed on the horizontal rod 26 adjacent which various symbols or numbers identifying the spacing between the rows marked by the ground scratching member when its collar 100 is positioned opposite the index mark involved.

As previously indicated, the frictional drag between the bottom end of the ground-scratching member 28 and the ground as the seeder is wheeled along the ground holds the ground-scratching means against the shoulder 97.

The present invention has thus provided an exceedingly simple and inexpensive seeder with attachments for simultaneously digging a furrow, dispensing seeds in the furrows, covering the furrow, and marking the next row to be covered by the seeder. It should be understood that numerous modifications may be made of the most preferred form of the invention above described without deviating from the broader aspects of the present invention.

I claim:

1. A home garden row seeder comprising: an upwardly and rearwardly extending frame piece having a handle grip at its upper end for pushing the seeder, a ground riding wheel assembly rotatably mounted upon the lower end of said frame piece and including a vertical, circular, wheel body member having a circular axially-extending flange extending about the center of said wheel body member at points spaced radially inwardly of the periphery thereof and having a series of circumferentally spaced seed-dispensing openings, a cup-shaped adjusting member in telescopic relation with said wheel body flange and having a central vertical wall portion closing off the space surrounded by said circular flange to form a seed container therewith and a circular side wall extending transversely inwardly from said central vertical portion and being in angularly adjustable, telescopic relation with said wheel body flange, said circular side wall having a series of circumferentially spaced seed-dispensing openings corresponding to said flange openings each of said openings being movable into progressive registry with the corresponding flange opening to vary the size of the resultant exposed opening for dispensing seeds of varying size, and means for holding said telescoping members in their adjusted angular positions comprising an axial extension projecting outwardly from said wheel body and passing through said vertical central wall portion of said adjusting member, said axial extension having laterally projecting means on the end thereof located outside of said central vertical wall portion of said cup-shaped adjusting member, said central vertical wall portion of said adjusting member having a slot through which said axial extension and its laterally projecting means can pass in at least one angular position of said cup-shaped member relative to said wheel-forming member to enable separation of the telescoping members, and spring means compressed between said telescoping members and urging the central wall portion of said cup-shaped adjusting member against said laterally projecting means, the friction therebetween helping to keep the telescoping members in their adjusted positions.

2. A home garden row seeder comprising: a upwardly and rearwardly extending frame piece having a handle grip at its upper end for pushing the seeder, a ground riding wheel assembly rotatably mounted upon the lower end of said frame piece and including a vertical, circular, wheel body member having a circular axially-extending flange extending about the center of said wheel body member at points spaced radially inwardly of the periphery thereof and having a series of circumferentially spaced seed-dispensing openings, a cup-shaped adjusting member in teelscopic relation with said wheel body flange and having a central vertical wall portion closing off the space surrounded by said circular flange to form a seed container therewith and a circular side wall extending transversely inwardly from said central vertical portion and being in angularly adjustable, telescopic relation wtih said wheel body flange, said circular side wall having a series of circumferentially spaced seed-dispensing openings corresponding to said flange openings, each of said openings being movable into progressive registry with the corresponding flange opening to vary the size of the resultant exposed opening for dispensing seeds of varying size, and means for holding said telescoping members in their adjusted angular positions comprising an axial extension projecting outwardly from said wheel body and passing through said vertical central wall portion of said adjusting member, said axial extension having laterally projecting means on the end thereof located outside of said central vertical wall portion of said cup-shaped adjusting member, and spring means compressed between said telescoping members and urging the central wall portion of said cup-shaped adjusting member against said laterally projecting means, the friction therebetween helping to keep the telescoping members in their adjusted positions.

References Cited in the file of this patent

UNITED STATES PATENTS

| | | |
|---|---|---|
| 159,148 | Braud | Jan. 26, 1875 |
| 269,869 | Mayers | Jan. 2, 1883 |
| 321,321 | Stanton | June 30, 1885 |
| 353,232 | Pates | Nov. 23, 1886 |
| 698,927 | Gale | Apr. 29, 1902 |
| 964,115 | Moore | July 12, 1910 |
| 965,121 | Pankey | July 19, 1910 |
| 1,055,347 | Mills | Mar. 11, 1913 |
| 1,164,393 | Randolph | Dec. 14, 1915 |
| 1,209,430 | Greimann | Dec. 19, 1916 |
| 1,653,228 | Rapp | Dec. 20, 1927 |
| 1,695,608 | Resseguie | Dec. 18, 1928 |
| 1,841,236 | Zaback | Jan. 12, 1932 |
| 2,302,716 | Riegelsberger et al. | Nov. 24, 1942 |

FOREIGN PATENTS

| | | |
|---|---|---|
| 122,744 | Great Britain | Feb. 6, 1919 |
| 127,424 | Great Britain | June 5, 1919 |